April 14, 1931.  F. H. VAN HOUTEN  1,800,418
DOUGH DIVIDER AND ROUNDER
Filed Aug. 4, 1930   3 Sheets-Sheet 1
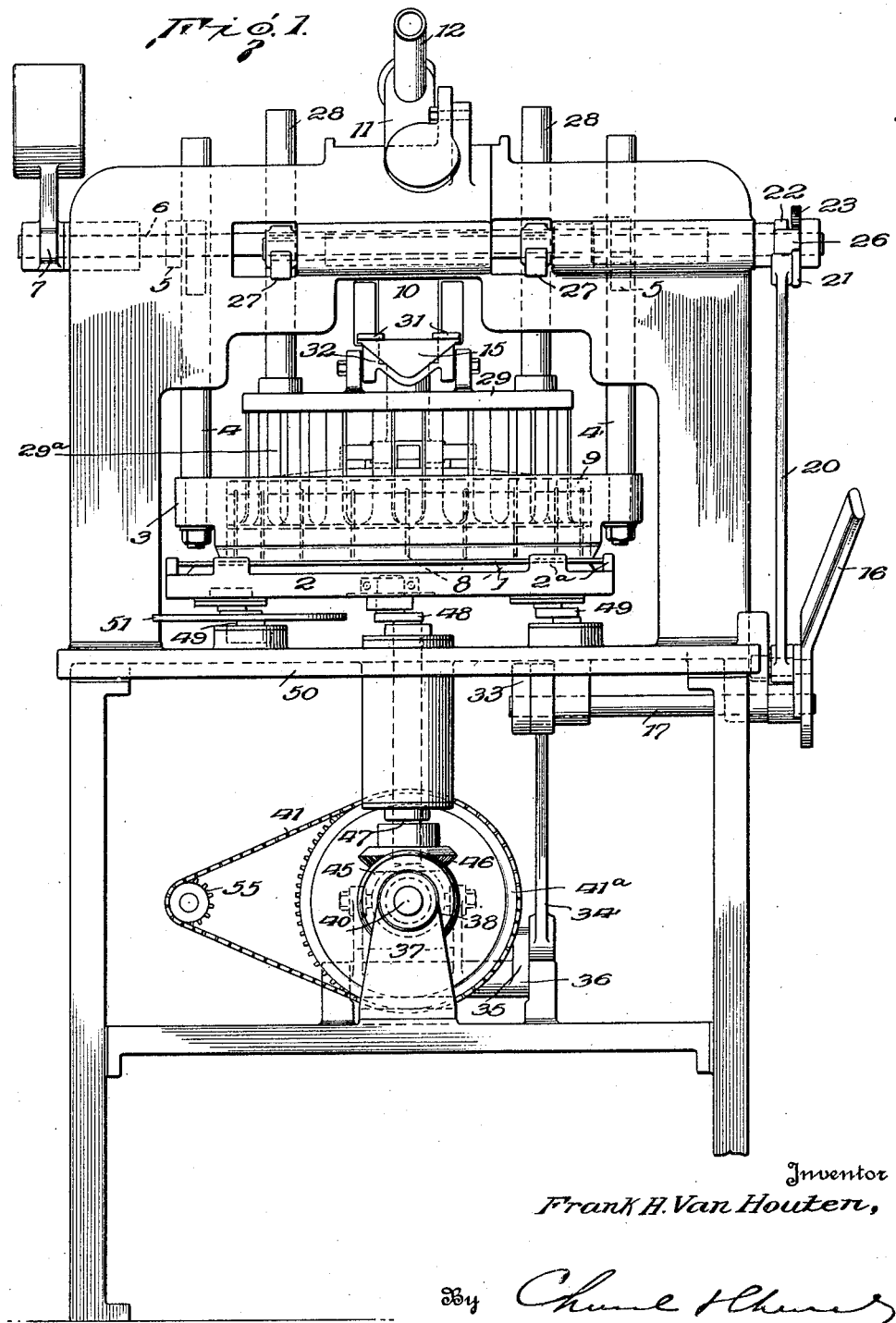
Inventor
Frank H. Van Houten,
By Chanel & Chanel
His Attorneys

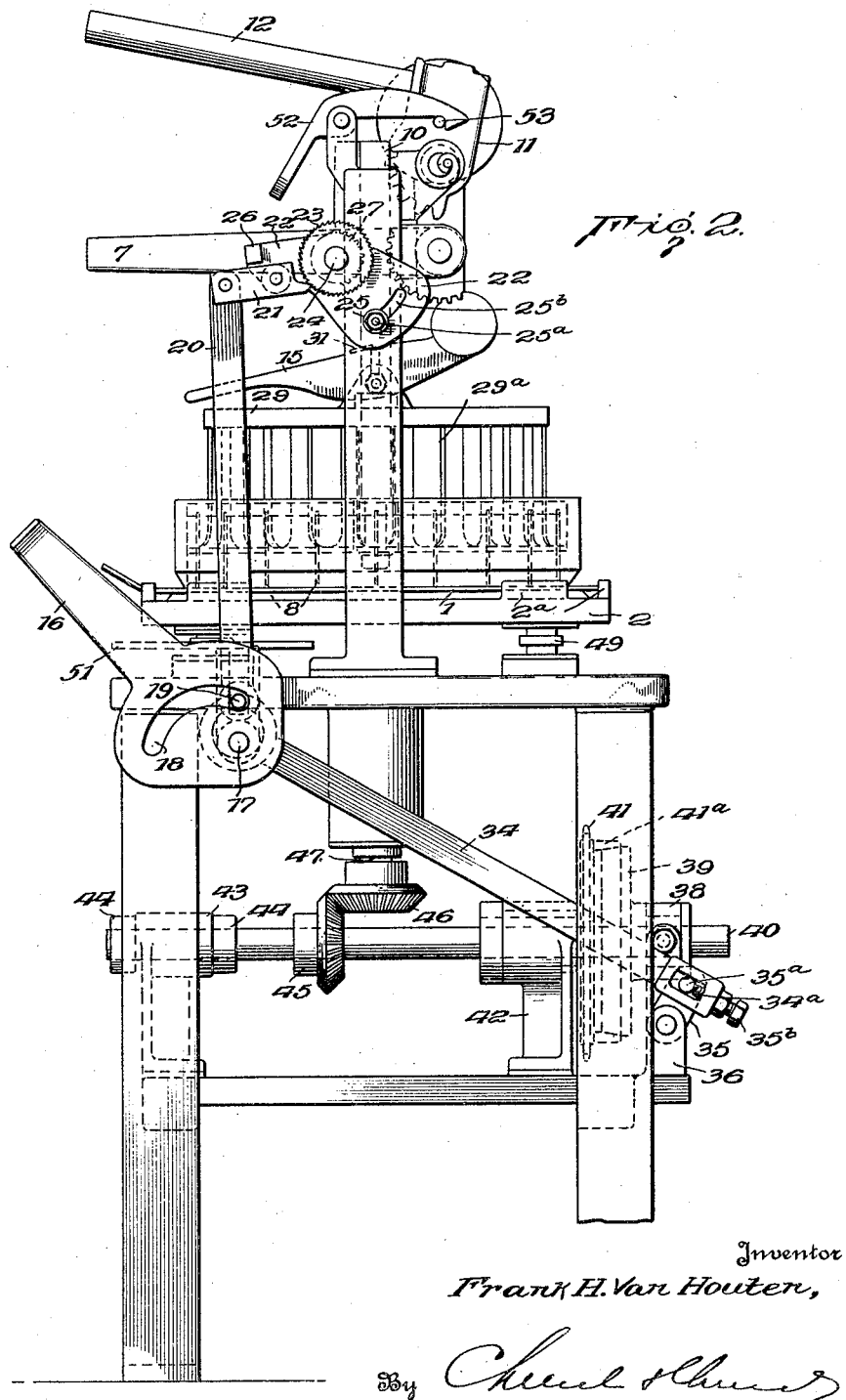

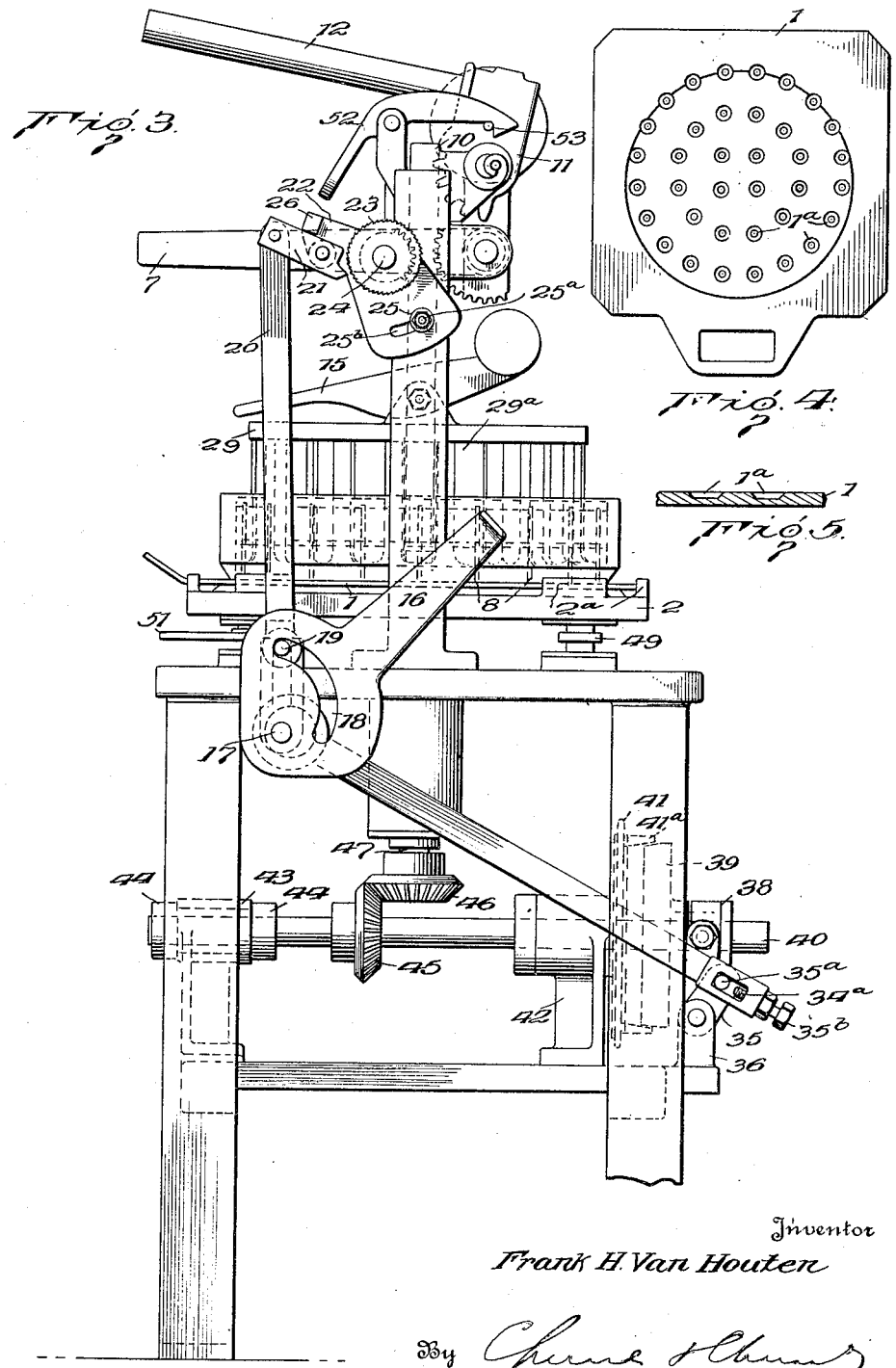

Patented Apr. 14, 1931

1,800,418

UNITED STATES PATENT OFFICE

FRANK H. VAN HOUTEN, OF BEACON, NEW YORK, ASSIGNOR TO DUTCHESS TOOL COMPANY, OF BEACON, NEW YORK, A CORPORATION OF NEW YORK

DOUGH DIVIDER AND ROUNDER

Application filed August 4, 1930. Serial No. 472,938.

This invention relates to improvements in dough handling apparatus and particularly to apparatus known as dough dividers and rounders.

More specifically, it relates to dough dividing machines of the type wherein a mass of dough is pressed in a receptacle of substantially pan-like formation and the mass of dough divided into sub-divisions or portions of substantially uniform bulk that are then rounded in the balls which, when baked, are usually referred to as rolls.

The invention is especially adapted for use in machines of the type disclosed in Patent No. 1,177,835, dated April 4, 1916, and No. 1,764,586, dated June 17, 1930. In those machines there are a plurality of knives for dividing the mass of dough and a plurality of plungers pressing the dough preparatory to its being sub-divided by said knives. In Patent No. 1,764,586, the support for the mass of dough is movable with a gyratory motion with respect to the knives and plungers for the purpose of rounding the individual sub-divisions after the latter have been formed by the knives and plungers. In the present instance it is proposed to improve upon the prior structures referred to by providing means for automatically relieving the pressure exerted on the sub-divisions by the plungers when the mechanism for rounding the sub-divisions is brought into action. In other words, in the machine of the present application, it would be impossible to render the driving connections operative for the purpose of actuating the dough support without having first relieved the sub-divisions of dough of the pressure exerted upon them by the plungers of the dividing mechanism.

A further object in the present machine is the provision of means for releasably locking the knives against movement with respect to the dough supporting surface while that surface is having the gyratory motion imparted thereto for the purpose of rounding the sub-divisions of dough.

With these and other objects in view, the invention consists of certain details of construction and combinations and arrangements of parts, all as will hereinafter be more fully described, and the novel features thereof particularly pointed out in the appended claims.

In the accompanying drawings,

Figure 1 is a front elevation of a machine embodying the present invention, the dividing head being illustrated in its lowered position but with the plungers slightly retracted.

Fig. 2 is a side elevation of a structure shown in Fig. 1.

Fig. 3 is a view similar to Fig. 2, but showing the plungers in their fully depressed position.

Fig. 4 is a plan view of the pallet or platen on which the mass of dough to be divided is placed.

Fig. 5 is a somewhat enlarged detailed sectional view of a portion of the pallet or platen.

The construction and manipulation of the knives and plungers constituting the divider head of the present machine is the same as in the machines shown and described in the two patents before referred to and, as a full description thereof is given in those patents, a detailed description herein is deemed unnecessary. Likewise, the support 2 on which the pallet or platen 1 for the dough to be divided is placed, is manipulated as described in Patent No. 1,764,586, above mentioned, and only a general description of the actuating parts for said support will be given herein. Referring to Figures 4 and 5, platen 1 is formed with a multiplicity of depressions 1ª, which are normally adapted to coincide with the spaces between the knives 8 of the divider head. These knives 8 are mounted in a casting 9 which in turn is supported by a rack 10, and segment 11, this segment being adapted to be rotated on its pivot by a handle 12. Surrounding the knives of the divider head is a ring guide 3 for confining the mass of dough within a limited area on pallet or platen 1, when the mass is pressed by the plungers of the divider head. This ring 3 is supported upon guide bars 4, each of which has a rack formed on one side thereof. Gear segments 5 mounted on a shaft 6 mesh with the racks on guide bars 4, and shaft 6 is adapted to be rotated by a lever 7 to raise and lower said ring 3 with respect to base or support 2. The plungers 29ᵃ carried by the plunger head 29 work in the spaces between the knives 8 for compressing dough on the platen 1, this plunger head and these plungers being adapted to travel in unison to a certain extent with the divider knives 8. That is, the plunger head 29 has pivoted thereon a trip lever 15 formed with projections 31 adapted to engage under projections 32 to releasably lock the plungers and knives together for movement toward the support 2. By rocking lever 15, and withdrawing projections 31 from under projections 32, the knives 8 can be advanced toward support 2 while the plungers remain stationary. This is for the purpose of dividing the mass of dough that may have been compressed by the plungers on the platen 1 on support 2. The construction and operation of the parts thus far described in connection with the plunger head 29 and knives 8 is the same as disclosed in the prior patents. However, in the present instance, there is pivoted on the frame of the machine a latch 52 that is adapted to fall by gravity over or into engagement with a pin 53 on segment 11 when the segment has been turned by lever 12 to the position wherein the knives 8 have been fully advanced or depressed with respect to support 2. It is desirable to lock the knives 8 in this position so as to insure their remaining stationary while the support 2 and platen 1 have a gyratory motion imparted thereto for the purpose of rounding the sub-divisions of dough confined between the knives, all as will hereinafter be more fully expressed.

Power from a suitable source is transmitted by connections (not shown) to a shaft 55 from which it is in turn transmitted by driving connection 54 to a sprocket 41 of section 41ᵃ of a clutch, this section of the clutch being rotatable in a bearing 42. The other section 39 of said clutch is a disc mounted on a shaft 40 so that it is compelled to turn the shaft but can be moved longitudinally on said shaft by a sleeve 38 and by arms 37 on a shaft 36. Shaft 40 has a bearing in the bore of clutch section 41ᵃ and a second bearing on the opposite side of the frame as indicated at 43, the shaft being held against longitudinal movement in its bearing by the collars 44. Mounted on shaft 40 is a gear 45 meshing with a gear 46 on a shaft 47 whose upper end is formed with a crank 48 attached to support 2 for the purpose of imparting a gyratory or oscillatory motion to said support or base. The weight of this base or support is carried on several small cranks indicated at 49, journaled in suitable bearings in the upper member 50 of the main frame of the machine. One of the front cranks 49 comprises a disc 51 that may be actuated to move base 2 into the proper position so that ring 3 can be brought down over a mass of dough on pallet 1 on said base. In view of Patent No. 1,764,586 which fully discloses and describes this feature of actuating the base 2, a detail description of the parts just generally described is unnecessary.

To rock shaft 36 and move clutch section 39 into or out of engagement with the other clutch section, said shaft 36 has an arm 35 formed with a pin 35ᵃ engaging in a slot 34ᵃ in a connecting rod 34. Pin 35 may be held in any desired position in slot 34ᵃ by an adjusting screw 35ᵇ. At its upper end rod 34ᵃ is operatively associated with an eccentric on a shaft 17, said shaft 17 being adapted to be rocked in its bearings by an operating lever 16. Adjacent shaft 17, lever 16 is somewhat enlarged and has formed therein arcuate slot 18, whose walls are arranged eccentrically of the center of rotation of shaft 17 and working in said slot is a pin 19 that is movable vertically in a slot in the main frame of the machine. Pin 19 is carried in the lower end of a connecting rod 20 whose upper end is pivotally attached to a ratchet 21 pivoted on a plate 22, loosely journaled on a shaft 24 in the upper portion of the machine. Mounted on said shaft 24 in position to be engaged by the ratchet 21, is a ratchet wheel 23, and also mounted on said shaft 24 are gears 27 adapted to mesh with rack bars 28 that project up from the plunger head 29. Plate 22, while loose on shaft 24, is, however, yieldingly held against rocking by a spring and washer indicated generally at 25, the bolt 25ᵃ on which said spring and washer are placed projecting through a slot 25ᵇ in said plate 22. Plate 22 is also provided with a projection 26 which overhangs the ratchet 21.

When the machine is idle, lever 16 and the parts operated thereby are in the position illustrated in Fig. 3. In this figure, however, the plungers and knives, as well as ring 3 are in the positions they would have assumed after lever 7 has been depressed to lower ring 3 and after lever 15 has been tripped and lever 12 lowered to fully depress the plungers and knives. With the plungers and knives in these assumed positions and assuming that the knives have then sub-divided the mass of dough on the platen 1, lever 16 is then depressed to engage clutch section 39 with clutch section 41ᵃ. This lowering movement of lever 16 will first cause link 20 to be pulled downwardly by reason of the eccentricity of slot 18 with respect to the center of shaft 17. This downward movement of link or rod 20 rocks ratchet 21 on its pivot on plate 22 until it engages ratchet wheel 23, and when the rocking movement of the ratchet is thus restrained, the resistance of plate 22 is overcome and the plate rocked on shaft 24. This causes gear 27 to elevate the plunger head and plungers through the racks 28. By the time lever 16 has assumed its fully depressed position, the eccentric 33 would have caused connecting rod 34 to rock shaft 36 and thereby fully engage clutch section 39 with the other section of said clutch so that power from shaft 55 will be transmitted by the driving connections heretofore described, to the crank 48 to impart the desired gyratory or oscillatory motion to the base or support 2. It might be added that the support 2 is formed with guides 2ᵃ around its periphery, within which the platen fits practically without side play, yet loosely enough to permit it to be easily inserted and removed.

What I claim is:

1. In a dough divider and rounder, the combination of a base, a plurality of knives and plungers, means for moving said knives and plungers toward and from said base, means for moving said base with a gyratory motion, control devices for said last mentioned means, and means operable by said control devices for moving said plungers away from said base.

2. In a dough divider and rounder, the combination of a dough supporting surface, a plurality of knives and plungers movable with respect to said surface, means for moving said surface relatively to said knives and plungers, control devices for said last mentioned means, and mechanism operable by said control devices for moving said plungers relatively to said knives and dough supporting surface.

3. In a dough divider and rounder, the combination of a base, a plurality of knives and plungers, means for moving said knives and plungers toward and from said base, a rack bar mounted on said plungers, a gear meshing with said rack bar, means for moving said base relatively to said knives and plungers, control devices for said last mentioned means, and means operable by said control devices for rotating said gear and moving said plungers relatively to the knives and base.

4. In a dough divider and rounder, the combination of a base, a plurality of knives and plungers, means for moving said knives and plungers toward and from said base, a rack bar mounted on said plungers, a gear meshing with said rack bar, means for moving said base relatively to said knives and plungers, control devices for said last mentioned means, said control devices comprising a cam member, and means operable by said cam member for rotating said gear to move said plungers relatively to said knives and base.

5. In a dough divider and rounder, the combination of a base, knives, plungers, means for moving said knives and plungers to and from said base, mechanism for moving said base relatively to said knives and plungers, control devices for said mechanism, a rack bar connected to said plungers, a shaft, a gear on said shaft meshing with said rack bar, and means operable by said control devices for rotating said gear.

6. In a dough divider and rounder, the combination of a base, knives, plungers, means for moving said knives and plungers to and from said base, mechanism for moving said base relatively to said knives and plungers, control devices for said mechanism, said control devices comprising a lever, a rack bar attached to said plungers, a shaft, a gear on said shaft meshing with said rack bar, a ratchet wheel on said shaft, a ratchet operatively associated with said ratchet wheel, and a link connected to the lever of said control devices and said ratchet for actuating said ratchet and rotating said ratchet wheel and shaft.

7. In a dough divider and rounder, the combination of a base, knives, plungers, means for moving said knives and plungers to and from said base, mechanism for moving said base relatively to said knives and plungers, control devices for said mechanism, said control devices comprising a lever, a rack bar attached to said plungers, a shaft, a gear on said shaft meshing with said rack bar, a ratchet wheel on said shaft, a plate journaled on said shaft, means for yieldingly holding said plate against rotation on said shaft, a ratchet on said plate engageable with said ratchet wheel, and a link connected to the lever of said control devices and said ratchet for actuating said ratchet and rotating said ratchet wheel and shaft.

8. In a dough divider and rounder, the combination of a base, knives, plungers, means for moving said knives and plungers to and from said base, mechanism for moving said base relatively to said knives and plungers, control devices for said mechanism, said control devices comprising a lever, a rack bar attached to said plungers, a shaft, a gear on said shaft meshing with said rack bar, a ratchet wheel on said shaft, a plate journaled on said shaft, means for yieldingly holding said plate against rotation on said shaft, a ratchet on said plate engageable with said ratchet wheel, said plate being rotatable in one direction when said ratchet is in engagement with said ratchet wheel, a shoulder on said plate engageable by said ratchet for rotating said plate in the opposite direction, and a link connected to the lever of said control devices and said ratchet for actuating said ratchet and rotating said ratchet wheel and shaft.

FRANK H. VAN HOUTEN.